(12) United States Patent
Pandit et al.

(10) Patent No.: US 8,611,900 B2
(45) Date of Patent: Dec. 17, 2013

(54) METHODS AND APPARATUS FOR A MOBILE BROKER SUPPORTING INTER-RAT, INTER-OPERATOR HANDOVERS

(75) Inventors: Krishna S. Pandit, Nuremberg (DE); Armin Dekorsy, Nuremberg (DE); Hendrik Schoeneich, Heroldsberg (DE)

(73) Assignee: Qualcomm Incorporated, San Diego, CA (US)

( * ) Notice: Subject to any disclaimer, the term of this patent is extended or adjusted under 35 U.S.C. 154(b) by 386 days.

(21) Appl. No.: 12/408,423

(22) Filed: Mar. 20, 2009

(65) Prior Publication Data

US 2010/0240370 A1 Sep. 23, 2010

(51) Int. Cl.
*H04W 36/00* (2009.01)

(52) U.S. Cl.
USPC ......... 455/436; 455/435.2; 370/331; 370/338

(58) Field of Classification Search
USPC .................. 455/436, 435.2; 370/338, 331
See application file for complete search history.

(56) References Cited

U.S. PATENT DOCUMENTS

| | | | | |
|---|---|---|---|---|
| 2003/0235164 | A1* | 12/2003 | Rogers et al. ................. | 370/331 |
| 2006/0092890 | A1* | 5/2006 | Gupta et al. ................. | 370/338 |
| 2007/0032235 | A1* | 2/2007 | Wahl et al. ................. | 455/435.2 |
| 2008/0102787 | A1* | 5/2008 | Landschaft et al. ........ | 455/404.2 |

OTHER PUBLICATIONS

3GPP: "3rd Generation Partnership Project; Technical Specification Group Core Network and Terminals; Access to the 3GPP Evolved Packet Core (EPC) via non-3GPP access networks; Stage 3; (Release 8)" 3GPP TS 24.302 V8.1.0 (Mar. 2009), [Online] Mar. 19, 2009, pp. 1-43, XP002556032 Retrieved from the Internet: URL:http://www.3gpp.org/ftp/Specs/archi ve/24_seri es/24.302/24302-810.zi p> [retrieved on Nov. 18, 2009] * chapters 5, 6.8 * * Annex A*.
3GPP: "3rd Generation Partnership Project; Technical Specification Group Services and System Aspects; Architecture enhancements for non-3GPP accesses (Release 9)" 3GPP TS 23.402 V9.0.0 (Mar. 2009), [Online] Mar. 12, 2009, p. 1,41-43,149-151, XP002556031 Retrieved from the Internet: URL:http://www.3gpp.org/ftp/Specs/archive/ 23_series/23.402/23402-900.zi p> [retrieved on Nov. 18, 2009] * chapters 4.8.1-4.8.3, 8.5.
Ashut0sh Dutta et al: "Network Discovery Mechanisms for Fasthand off" Broadband Communications, Networks and Systems, 2006. Broadnets 2006. 3rd International Conference on, IEEE, PI,Oct. 1, 2006, pp. 1-11, XP031155943 ISBN: 978-1-4244-0424-7 * chapters 1, 3, 4, 5 *.
Intel: "Network Discovery General Concepts" 3GPP Draft; CI-081395, 3rd Generation Partnership Project (3GPP), Mobile Competence Centre ; 650, Route Des Lucioles ; F-06921 Sophia-Antipolis Cedex ; France, vol. CT WG1, No. Jeju Island; Apr. 11, 2008, XP050028646 [retrieved on Apr. 11, 2008] the whole document.

(Continued)

*Primary Examiner* — Amancio Gonzalez
(74) *Attorney, Agent, or Firm* — S. Hossain Beladi

(57) ABSTRACT

A method for determining an optimal access network by an apparatus is described. The method may include communicating with a first base station as part of a first access network using a first radio access technology (RAT). Information about access networks available to the apparatus may be received from a mobile broker. An optimal access network and the corresponding optimal RAT may be selected based on the received information. The method may also include switching to communications with a second base station using a second RAT.

36 Claims, 12 Drawing Sheets

(56) References Cited

OTHER PUBLICATIONS

Yaqub R et al: "Architecture supporting network discovery in future heterogeneous networks" Multitopic Conference, 2008. INMIC 2008. IEEE International, IEEE, Piscataway, NO, USA, Dec. 23, 2008, pp. 313-317, XP031421022 ISBN: 978-1-4244-2823-6 abstract * chapter III, VI.VI *.
3GPP: "3rd Generation Partnership Project; Technical Specification Group Core Network and Terminals; Access to the 3GPP Evolved Packet Core (EPC) via non-3GPP access networks; Stage 3; (Release 8)" 3GPP TS 24.302 V8.1.0 (Mar. 2009), [Online] Mar. 19, 2009, pp. 1-43, XP002556032 Retrieved from the Internet: URL:http://www.3gpp.org/ftp/Specs/archive/24_series/24.302/24302-810.zi p> [retrieved on Nov. 18, 2009] * chapters 5, 6.8 * * Annex A*.
3GPP: "3rd Generation Partnership Project; Technical Specification Group Services and System Aspects; Architecture enhancements for non-3GPP accesses (Release 9)" 3GPP TS 23.402 V9.0.0 (Mar. 2009), [Online] Mar. 12, 2009, p. 1,41-43,149-151, XP002556031 Retrieved from the Internet: URL:http://www.3gpp.org/ftp/Specs/archive/ 23_series/23.402/23402-900.zi p> [retrieved on Nov. 18, 2009] * chapters 4.8.1-4.8.3, 8.5.

Ashut0sh Dutta et al: "Network Discovery Mechanisms for Fast-hand off" Broadband Communications, Networks and Systems, 2006. Br0adnets 2006. 3rd International Conference on, IEEE, PI, Oct. 1, 2006, pp. 1-11, XP031155943 ISBN: 978-1-4244-0424-7 * chapters 1, 3, 4, 5 *.
International Search Report and Written Opinion—PCT/US2009/042420—International Search Authority, European Patent Office, Nov. 27, 2009.
Yaqub R et al: "Architecture supporting network discovery in future heterogeneous networks" Multitopic Conference, 2008. INMIC 2008. IEEE International, IEEE, Piscataway, NO, USA, Dec. 23, 2008, pp. 313-317, XP031421022 ISBN: 978-1-4244-2823-6 abstract * chapter II, VI.VII *.
Taiwan Search Report—TW098114422—TIPO—Aug. 20, 2012.
Intel: "Network Discovery General Concepts", 3GPP Draft; C1-081395, 3RD Generation Partnership Project (3GPP), Mobile Competence Centre ; 650, Route Des Lucioles ; F-06921 Sophia-Antipolis Cedex; France, vol. CT WG1, No. Jeju Island; Apr. 11, 2008, XP050028646 [retrieved on Apr. 11, 2008] the whole document.

* cited by examiner

US 8,611,900 B2

METHODS AND APPARATUS FOR A MOBILE BROKER SUPPORTING INTER-RAT, INTER-OPERATOR HANDOVERS

TECHNICAL FIELD

The present disclosure relates generally to communication systems. More specifically, the present disclosure relates to methods and apparatus for a mobile broker supporting inter-RAT, inter-operator handovers.

BACKGROUND

Wireless communication systems are widely deployed to provide various types of communication content such as voice, video, data, and so on. These systems may be multiple-access systems capable of supporting simultaneous communication of multiple terminals with one or more base stations.

As used herein, the term "user equipment" refers to an electronic device that may be used for voice and/or data communication over a wireless communication network. Examples of user equipment include cellular phones, personal digital assistants (PDAs), handheld devices, wireless modems, laptop computers, personal computers, etc. A user equipment may alternatively be referred to as a mobile station, a mobile terminal, a subscriber station, a remote station, a user terminal, a terminal, an access terminal, a subscriber unit, etc.

A wireless communication network may provide communication for a number of user equipments, each of which may be serviced by a base station. A base station may alternatively be referred to as an access point, a Node B, or some other terminology.

A base station may be part of an access network. An access network may include one or more base stations with the same network operator. Each of the base stations in an access network may use the same radio access technology (RAT). A user equipment may connect to a base station within an access network if the user equipment has a service level agreement (SLA) with the network operator.

With the current number of RATs available for consumer use being fairly low, a user equipment may scan all the available access networks before deciding on which access network (and corresponding RAT) is best. However, new techniques such as software defined radio and developments to decouple the core network from the access network may boost the development of more RATs. Multi-mode chipsets may enable this development. As the number of RATs increases, a user equipment may have to check more and more supported access networks to determine the optimal access network. This method may be time and battery power consuming.

Procedures for inter-operator handovers (including those that are inter-RAT) have been addressed by the 3$^{rd}$ Generation Partnership Project (3GPP). The Access Network Discovery and Support Function (ANDSF) has been introduced, thereby providing information on available networks and policies to a user equipment. However, the ANDSF belongs to an operator and is thus not suited to determine the best available access network for a user equipment among different network operators.

A further trend in 3GPP is the introduction of client based mobility. Client based mobility eases inter-RAT handovers from a technical perspective. Although network operators may cooperate sufficiently to enable inter-operator handovers and inter-operator, inter-RAT handovers, network operators may not cooperate enough to determine the best available access network for the UE. Accelerated and efficient access network selection may lead to a better user experience by creating service continuity with seamless handovers.

DETAILED DESCRIPTION

Figure 1:
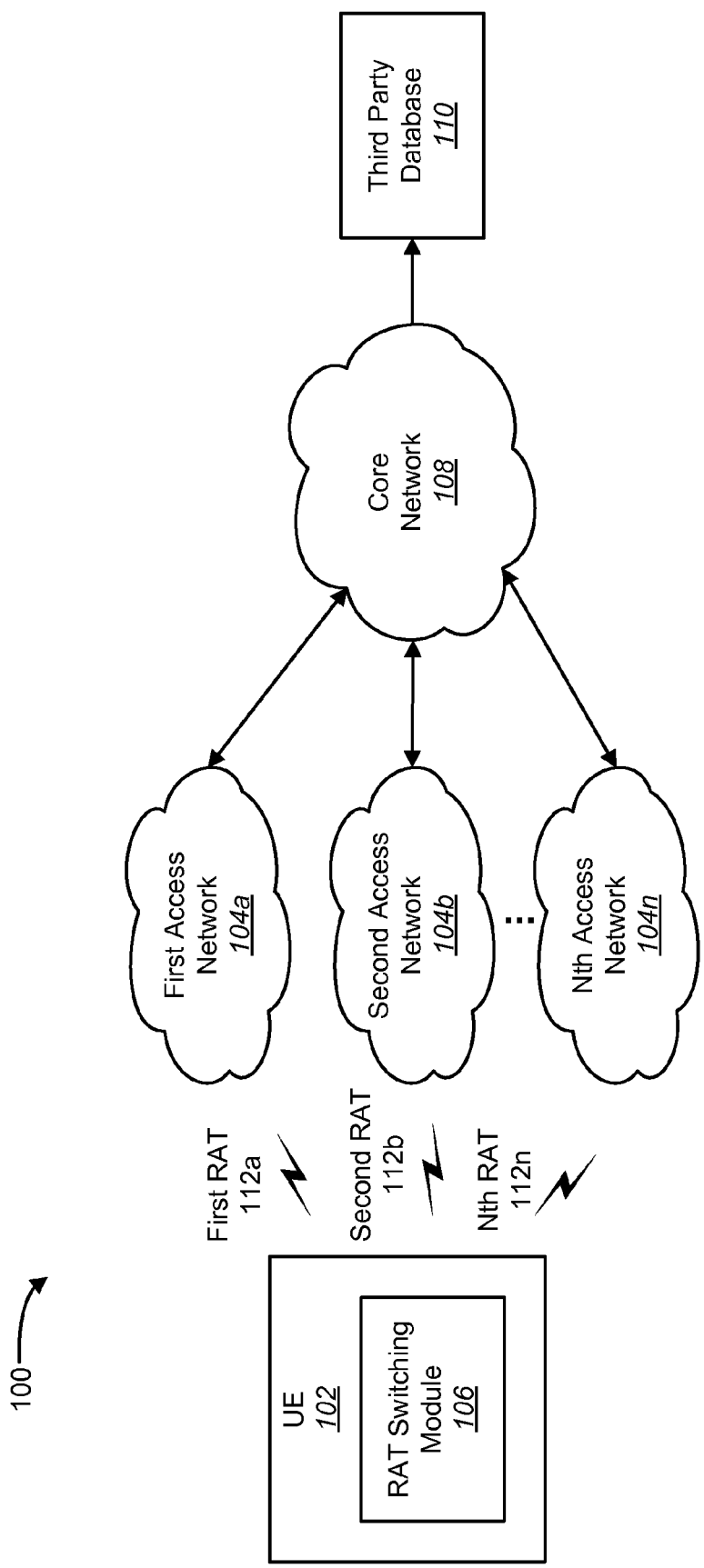
FIG. 1 shows a wireless communication system with a user equipment (UE), multiple access networks, a core network, and a third party database.

An apparatus configured for determining an optimal access network is described. The apparatus includes a processor. The apparatus also includes circuitry coupled to said processor. The circuitry is configured to communicate with a first base station as part of a first access network using a first radio access technology (RAT). Information about the access networks available to the apparatus is received from a mobile broker. An optimal access network and a corresponding optimal RAT are selected based on the received information. The circuitry is also configured to switch to communications with a second base station using a second RAT.

An available networks request may be sent to the mobile broker. The available networks request may be a request for information about access networks available to the apparatus. The available networks request may include location information for the apparatus, cost information for the apparatus, and/or a current service provider for the apparatus. The available networks request may be triggered by a user of the apparatus or a policy-based trigger.

The second base station may be part of the optimal access network, and the second RAT may be the optimal RAT. The apparatus may be a wireless communications device.

The received information about the access networks available to the apparatus may include a ranking of the access networks available to the apparatus. Switching to communications with the second base station may involve an inter-RAT, inter-operator handover. Switching to communications with the second base station may be the beginning of a new session or a continuation of a session of communications.

A method for determining an optimal access network by an apparatus is also described. The method includes communicating with a first base station as part of a first access network using a first radio access technology (RAT). Information about the access networks available to the apparatus is received from a mobile broker. An optimal access network and a corresponding optimal RAT are selected based on the received information. The method also includes switching to communications with a second base station using a second RAT.

An apparatus configured for providing network ranking information to a mobile broker is described. The apparatus includes a processor. The apparatus also includes circuitry coupled to said processor. Network information is received from one or more user equipments (UEs). A request for the available networks is received from a requesting UE. Available access networks and corresponding radio access technologies (RATs) are determined for the requesting UE. Network ranking information of the available access networks and corresponding RATs are also determined for the requesting UE. The network ranking information is sent to the requesting UE.

The circuitry may be further configured to store the received network information in a network information database. The network information may be periodically received from a UE. A request for the network information may be sent to one or more UEs. The network information may include channel quality indicators, the UE location, the experienced throughput for the UE, and/or information about the communication quality of a wireless channel.

The circuitry may be further configured to exchange credits or payment for the received network information. The circuitry may also be configured to receive access network cost information from the requesting UE. Network ranking information of the access networks may be determined using the received cost information from the requesting UE.

An apparatus configured for determining an optimal access network is also described. The apparatus includes means for communicating with a first base station as part of a first access network using a first radio access technology (RAT). The apparatus also includes means for receiving information about the access networks available to the apparatus from a mobile broker and means for selecting an optimal access network and a corresponding optimal RAT based on the received information. The apparatus further includes means for switching to communications with a second base station using a second RAT.

A computer-program product for an apparatus configured for determining an optimal access network is also described. The computer-program product includes a computer-readable medium having instructions thereon. The instructions include code for communicating with a first base station as part of a first access network using a first radio access technology (RAT). The instructions also include code for receiving information about the access networks available to the apparatus from a mobile broker. The instructions further include code for selecting an optimal access network and a corresponding optimal RAT based on the received information. The instructions also include code for switching to communications with a second base station using a second RAT.

FIG. 1 shows a wireless communication system 100 with a user equipment (UE) 102, multiple access networks 104, a core network 108, and a third party database 110. A UE 102 may also be called, and may contain some or all of the functionality of, a terminal, a mobile station, an access terminal, a subscriber unit, a station, etc. A UE 102 may be a cellular phone, a personal digital assistant (PDA), a wireless device, a wireless modem, a handheld device, a laptop computer, etc.

An access network 104 may facilitate communications between a UE 102 and the core network 108. An access network 104 may include one or more base stations. The base stations may send and receive communications with the UE 102 using a radio access technology (RAT) 112. The access network 104 may be controlled by a network operator. A network operator may also be referred to as a service provider. Examples of service providers include Verizon, T-Mobile, etc. Examples of RATs 112 include Evolution Data Optimized (EV-DO), Ultra Mobile Broadband (UMB), wireless local area network (WLAN), Long Term Evolution (LTE), the Universal Mobile Telecommunications System (UMTS), the Global System for Mobile communications (GSM), IEEE 802.16 (also known as WiMAX), etc.

The core network 108 may be the central piece of a telecommunications network. For example, the core network 108 may facilitate communications with the Internet, other UEs, etc. A UE 102 may be connected to the core network 108 when the UE 102 can communicate with the core network 108.

The UE 102 may have an existing connection with the core network 108 through an access network 104. A UE 102 may thus be connected to both the core network 108 and an access network 104. For example, the UE 102 may be connected to a first access network 104a. Alternatively, the UE 102 may not yet have a connection to the core network 108 and may instead seek to establish a new connection with the core network 108 through an access network 104. A UE 102 may be capable of connecting to the core network 108 using multiple access networks 104 non-concurrently. For example, a UE 102 may be capable of connecting to the core network 108 through a first access network 104a and a second network 104b.

Each access network 104 may use a different RAT 112. For example, the first access network 104a may use a first RAT 112a and the second access network 104b may use a second RAT 112b. Each access network 104 may be controlled by a different operator.

It may be advantageous for the UE 102 to connect to the core network 108 using the best available access network 104. For example, the UE 102 may start a new session of communications with the core network through one or more access networks 104. At the beginning of a new session, the UE 102 may search for the best available network 104. Alternatively, the UE 102 may already be involved in a session of communications with the core network through a first access network 104, and it may be beneficial for a UE 102 to trigger a switch from a connection with the first access network 104a to a connection with the second access network 104b. The UE 102 may switch from a connection with the first access network 104a to a connection with the second access network 104b using an RAT switching module 106. The RAT switching module 106 may allow the UE 102 to change the RAT 112 used by the UE 102 in communications with an access network 104.

A switch from a connection with the first access network 104a to a connection with the second access network 104b may be referred to as an inter-operator handover. If the first access network 104a and the second access network 104b use different RATs 112 (i.e. the first RAT 112a and the second RAT 112b are different), a switch from a connection with the first access network 104a to a connection with the second access network 104b may be referred to as an inter-RAT, inter-operator handover.

Discovering a new access network 104 during a session may only be worthwhile if a seamless handover to the new access network 104 is possible. Client mobility may make the inter-operator handovers easier. Considering the development in 3GPP, it is likely that there will be sufficient cooperation between operators to execute such handovers. However, the cooperation is unlikely to progress to the point where operators collaborate to determine the optimal access network 104 for a UE 102.

Although each operator of each access network 104 may have service level agreements (SLAs) governing inter-RAT, inter-operator handovers, each of the operators for each of the access networks 104 may be unwilling to collaborate to the extent that the operators share their information with a UE 102 to enable optimal decisions on inter-RAT, inter-operator handovers.

A third party database 110 may be introduced to allow for optimal inter-RAT, inter-operator handovers without the need for operator collaboration. The third party database 110 may be an independent entity. The third party database 110 may maintain a database of network conditions. The third party database 110 may be maintained by a mobile broker, which has relationships with the users. A third party database may be a computer based entity as part of a mobile broker.

Figure 2:
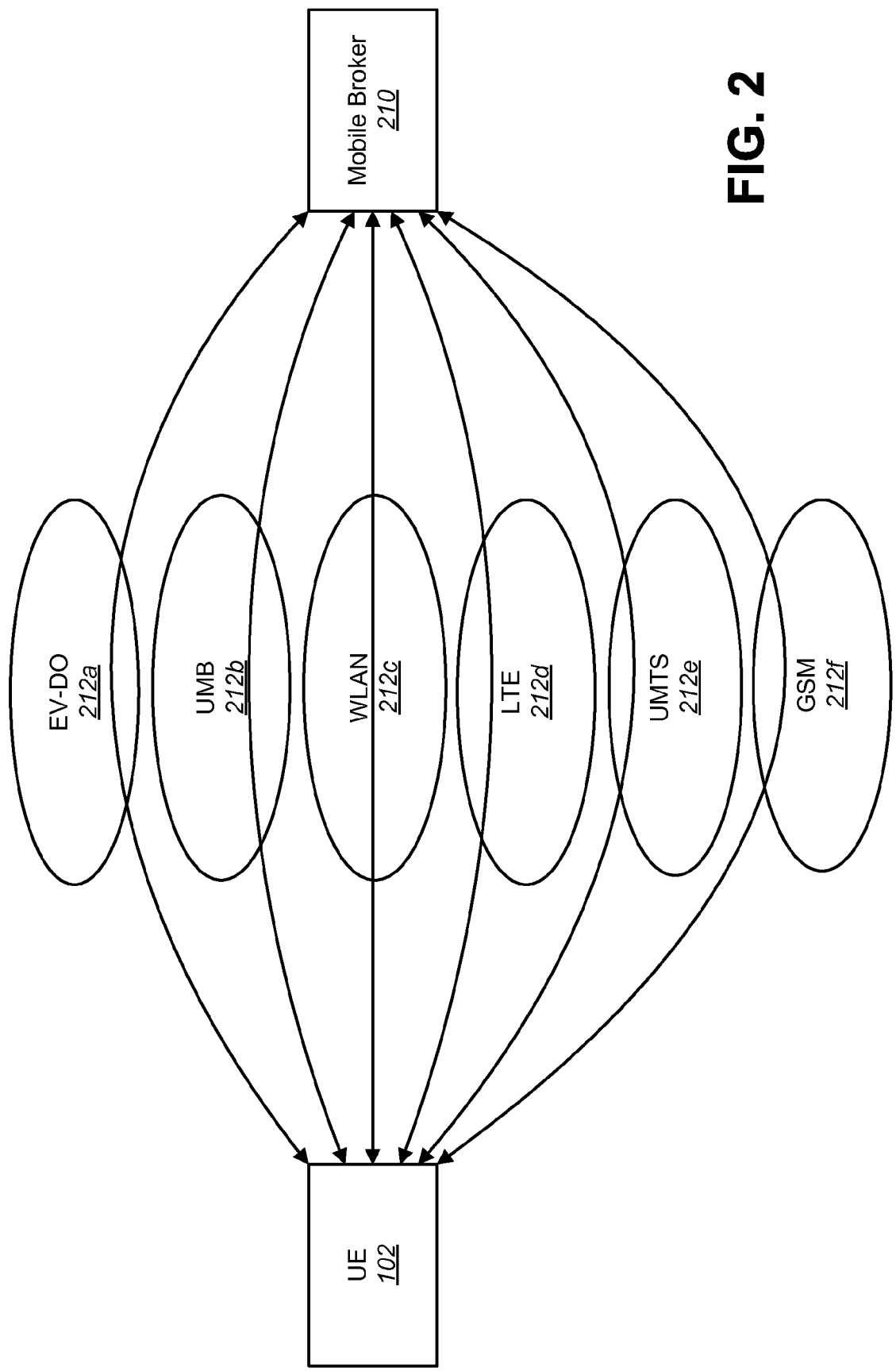
FIG. 2 is a block diagram illustrating some of the possible methods of communication between a UE and a mobile broker.

FIG. 2 is a block diagram illustrating some of the possible methods of communication between a UE 102 and a mobile broker 210. A UE 102 may connect to the mobile broker 210 via every access network 104 over internet protocol (IP), just as the UE 102 may connect to any server. Thus, a UE 102 may connect to the mobile broker 210 using Evolution Data Optimized (EV-DO) 212a, Ultra Mobile Broadband (UMB) 212b, a wireless local area network (WLAN) 212c, Long Term Evolution (LTE) 212d, the Universal Mobile Telecommunications System (UMTS) 212e, the Global System for Mobile Communications (GSM) 212f, etc. A UE 102 may connect to the mobile broker 210 via additional RATs 112 not shown.

Figure 3:
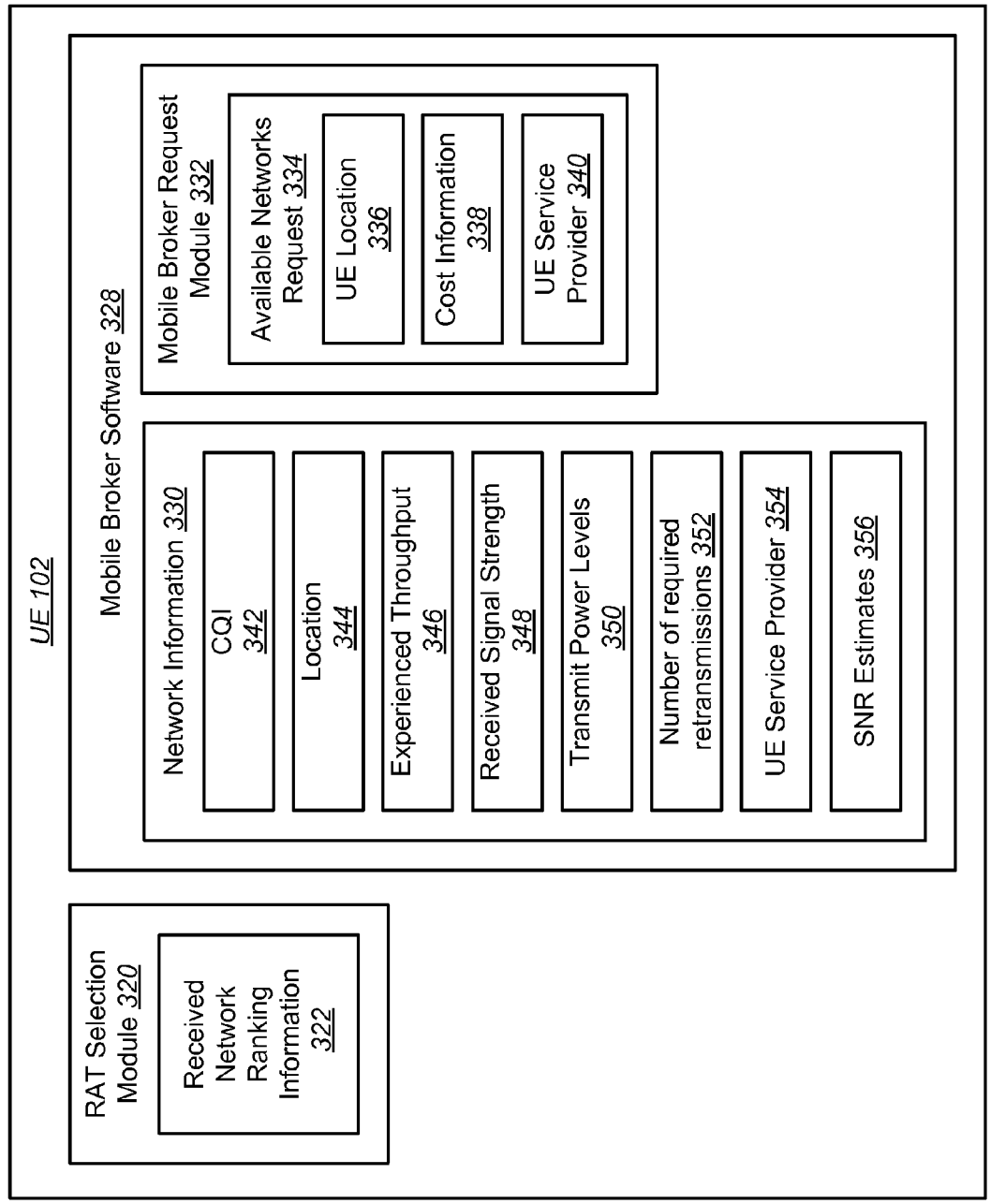
FIG. 3 is a block diagram illustrating some of the components of a UE.

FIG. 3 is a block diagram illustrating some of the components of a UE 102. The UE 102 may have an existing relationship with a mobile broker 210. The UE 102 may be configured to provide information to the mobile broker 210 and/or to receive information from the mobile broker 210. For example, the UE 102 may be configured to assist the mobile broker 210 in monitoring network conditions. As another example, the UE 102 may make requests to the mobile broker 210 for assistance in selecting an optimal access network 104 and RAT 112.

The UE 102 may include mobile broker software 328. The mobile broker software 328 may be received from the mobile broker 210. The mobile broker software 328 may be installed on UEs 102 that participate in the network information sharing provided by the mobile broker 210. The mobile broker software 328 may assist the UE 102 in providing information concerning network conditions to the mobile broker 210. For example, the mobile broker software 328 may collect network information 330 to be sent to the mobile broker 210.

Network information 330 may include channel quality indicator (CQI) values 342. The CQI values 342 may be a measurement of the communication quality of wireless channels. The UE 102 may collect CQI values 342 from the radio parameters of an RF chip. To collect metrics indicating the quality of the physical channel, new interfaces from the RF chip to the UE software may be required. Thus, the UE 102 may include an interface between the UE software and the RF chip that allows the UE 102 to access the relevant parameters.

Network information 330 may also include the current location 344 of the UE 102. The location 344 of the UE 102 may be determined by triangulating the base stations by means of a GPS receiver. Alternatively, the location 344 of the UE 102 may be estimated based on the signal levels received by the UE 102 from various base stations and/or the signal levels required by the UE 102 to send transmissions to the base stations.

The network information 330 may also include the experienced throughput 346 of the mobile broker software 328. For example, the network information 330 may include information concerning a current download and the experienced download rate. Although this information may be relatively simple to retrieve on the UE 102, it may not accurately reflect the status of the access network 104 because the information can be influenced by outside parameters such as bottlenecks in the Internet or the application server. However, this drawback may be overcome by the mobile broker 210 analyzing the data for multiple UEs 102.

The network information 330 may also include the received signal strength 348 by the UE 102. For example, the number of bars, which indicate the signal strength received by the UE 102, is located on many UE 102 displays. The network information 330 may also include the transmit power levels 350 of the UE 102, the number of required retransmissions 352, the UE service provider 354 (i.e. the access network 104 or operator that the UE 102 is currently connected to) and estimates of the signal to noise ratio (SNR) 356.

The mobile broker software 328 may include a mobile broker request module 332. The mobile broker request module 332 may assist the mobile broker software 328 in requesting and obtaining information from the mobile broker 210. The mobile broker request module 332 may generate an available networks request 334. An available networks request 334 may be a request for information about available access networks 104 from a mobile broker 210. For example, the available networks request 334 may be a message to be sent to a mobile broker 210 requesting information concerning the access networks 104 available to the UE 102. The available networks request 334 may be sent to the mobile broker 210. The available networks request 334 may include the UE location 336. The available networks request 334 may also include cost information 338 relating to each access network 104. For example, the available networks request 334 may include details of the subscriptions and/or prepaid modalities for the UE 102. Each available networks request 334 may include the cost information 338. Alternatively, the cost information 338 may only be provided to the mobile broker 210 once, and the mobile broker 210 may store the cost information for the UE 102 in a database. Each available networks request 334 may also include the current service provider 340 for the UE 102.

An available networks request 334 may be triggered by the user of the UE 102. For example, the user may push a button on the UE 102 that initiates the sending of an available networks request 334. In pay-per-use scenarios, user initiated available networks requests 334 may give the user full cost control. Alternatively, an available networks request 334 may be triggered by a policy-based trigger. A policy-based trigger may include rules/policies for when to send an available networks request 334. For example, an available networks request 334 may be triggered when the received signal strength 348 drops below 60%. As another example, an available networks request 334 may be triggered periodically (e.g., every two minutes).

The UE 102 may also include an RAT selection module 320. The RAT selection module 320 may assist the UE 102 in selecting the optimal RAT 112 and access network 104 for wireless communications with the core network 108. For example, the RAT selection module 320 may assist the UE 102 in determining whether to select the first access network 104a (and the corresponding first RAT 112a) or to select the second access network 104b (and the corresponding second RAT 112b) for communications with the core network 108. The ultimate decision as to whether the UE 102 can connect to an access network 104 may belong to the network operator. The mobile broker 210 may only offer assistance.

The RAT selection module 320 may make access network/RAT determinations using information received from the mobile broker 210. For example, the UE 102 may receive network ranking information 322 from the mobile broker 210. The received network ranking information 322 may include a list of the available networks for the UE 102. The received network ranking information 322 may also include a suggested ranking of the available networks. The RAT selection module 320 may then determine the optimal access network 104 and RAT 112. Alternatively, the received network ranking information 322 may include only the determined optimal access network 104 and RAT 112. Thus, either the mobile broker 210 or the UE 102 may decide which access network 104 and RAT 112 are optimal. Because it may be inefficient for the mobile broker 210 to send network information for all the access networks 104 available to the UE 102, it may be beneficial for the mobile broker 210 to send a shortlist of available access networks 104 along with a suggestion on which access network 104 the UE 102 should select. The UE 102 may receive the shortlist of available access networks 104 and then make the determination of which access network 104 to connect to.

Figure 4:
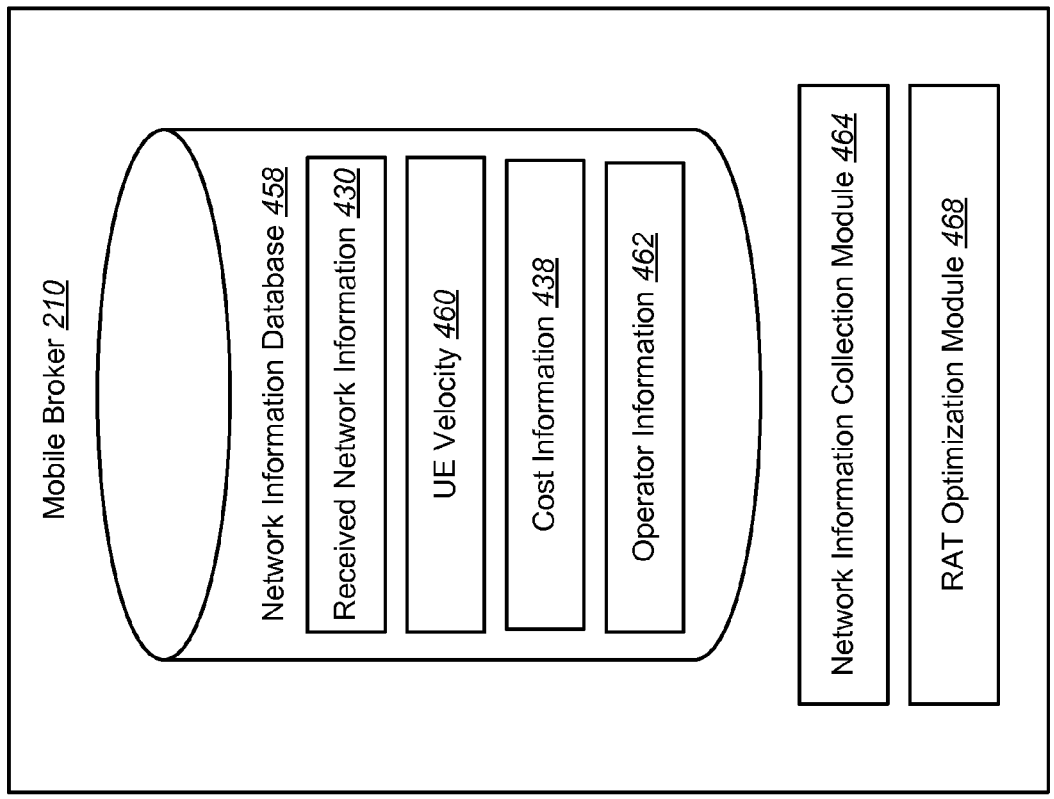
FIG. 4 is a block diagram of a mobile broker for use in the present methods and apparatus.

FIG. 4 is a block diagram of a mobile broker 210 for use in the present methods and apparatus. The mobile broker 210 may operate independent of the access networks 104. For example, the mobile broker 210 may be maintained by a third party that is not under the control of any of the operators of the access networks 104. Better access network 104 selection may be achieved using the mobile broker than with databases belonging to operators.

The mobile broker 210 may include a network information database 458. The network information database 458 may enable the mobile broker 210 to provide information concerning the access networks 104 available at each location where a UE 102 may operate. The network information database 458 may include the received network information 430 from the UEs 102. As discussed above in relation to FIG. 3, network information 430 may include CQIs 342, UE location 344, experienced throughput 346, received signal strength 348, SNR estimates 356, transmit power levels 350, the number of required retransmissions 352, the UE service provider 354, etc.

The network information database 458 may also include the UE velocity 460. The UE velocity 460 may be received as part of the received network information 430. Alternatively, the UE velocity 460 may be calculated by the mobile broker 210. The mobile broker 210 may use the UE velocity 460 to calculate the optimal access network 104 for a UE 102. For example, a WLAN hotspot may be the optimal access network 104 for a slow moving UE 102 but a poor choice for a fast moving UE 102, since the fast moving UE 102 will quickly lose coverage with the WLAN.

The network information database 458 may also include cost information 438. For example, the network information database 458 may include the different monetary charges for switching to and from each access network 104 for each UE 102. The cost information 438 may be received from a UE 102. Alternatively, the mobile broker 210 may receive information including cost information 438 from the operator of an access network 104. Although the operator may not fully cooperate with the mobile broker 210, the operator may provide some information to the mobile broker 210. The network information database 458 may also include operator information 462. For example, the network information database 458 may include the service level agreements (SLAs) between each UE 102 and the network operators.

The mobile broker 210 may also include a network information collection module 464. The network information collection module 464 may collect network information 330 from UEs 102 and network operators. Because the mobile broker 210 operates independent of the network operators, the mobile broker 210 may take into account the fact that network operators generally do not have incentives to freely share information with the mobile broker 210. The network information collection module 464 may store the collected network information 330 in the network information database 458. The network information collection module 464 may receive periodic updates from UEs 102 and/or network operators. Alternatively, the network information collection module 464 may send requests to UEs 102 and/or network operators to provide needed network information 330.

The mobile broker 210 may include an RAT optimization module 468. The RAT optimization module 468 may analyze the information in the network information database 458, including the received network information 430, along with available networks requests 334 from UEs 102. The RAT optimization module 468 may determine the optimal access network 104/RAT 112 for a UE 102 according to the analysis of the information in the network information database 458. For example, the RAT optimization module 468 may determine that the first access network 104a and the first RAT 112a are optimal for a UE 102. Alternatively, the RAT optimization module 468 may determine a ranking for each of the available access networks 104/RATs 112 for a UE 102. For example, the RAT optimization module 468 may determine that the first access network 104a/first RAT 112a are a possible candidate for the UE 102 but that the second access network 104b/second RAT 112b are a more optimal candidate for the UE 102. The RAT optimization module 468 may then send a shortlist of the available access networks 104 and the respective rankings for each available access network 104 to the UE 102.

Figure 5:
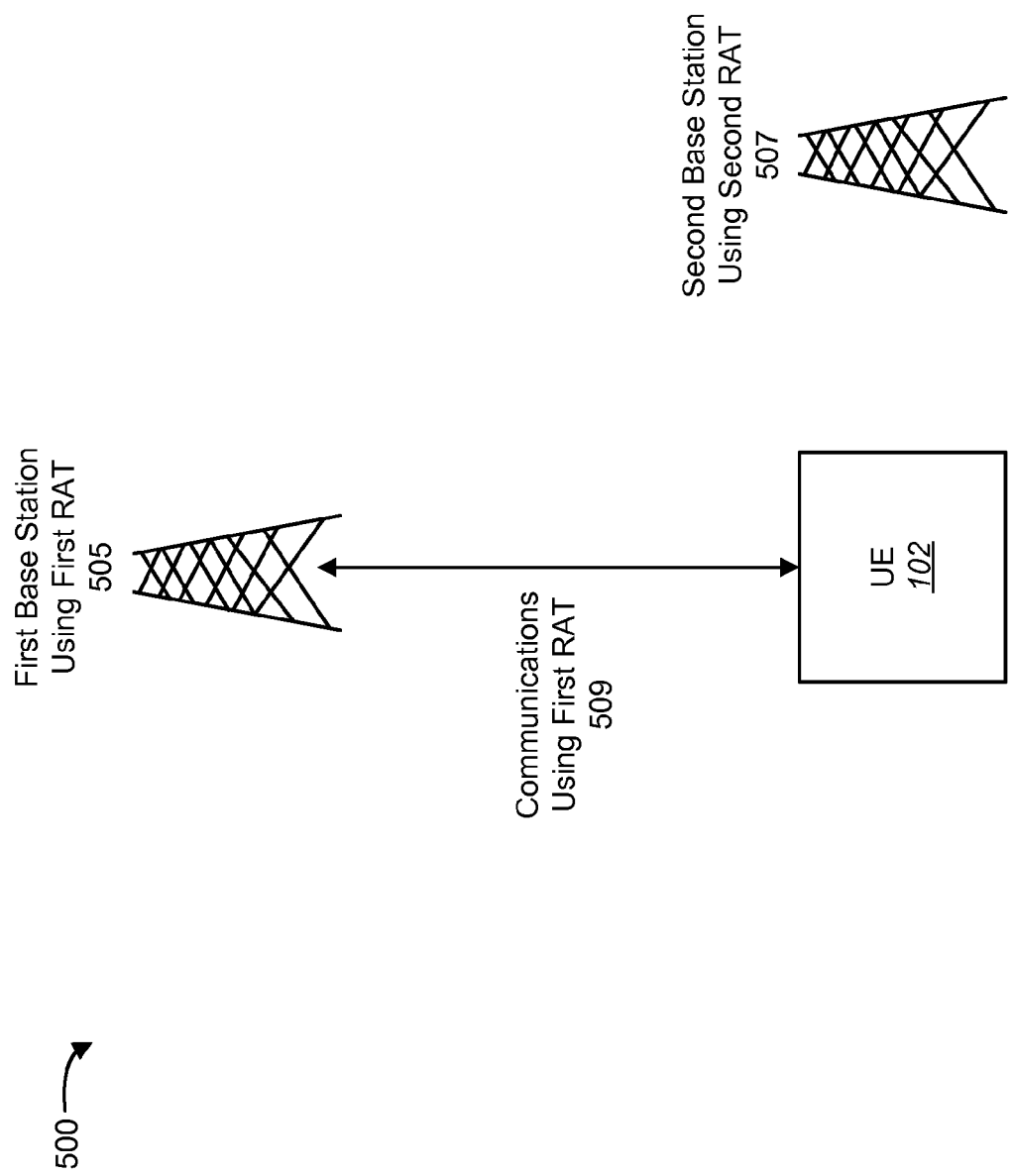
FIG. 5 shows a wireless communication system with a UE and multiple base stations.

FIG. 5 shows a wireless communication system 500 with a UE 102 and multiple base stations 505, 507. Each of the base stations 505, 507 may be part of a different access network 104 controlled by a different network operator. For example, a first base station 505 using a first RAT 112a may be part of a first access network 104a controlled by a first network operator. Examples of access networks 104 controlled by network operators include Verizon, T-Mobile, wireless hotspots, etc.

The UE 102 may have an existing connection with the first base station 505 using the first RAT 112a. In other words, the UE 102 may communicate with the core network 108 through the first base station 505 and the UE 102 may communicate 509 with the first base station 505 using the first RAT 112a. The location of the UE 102 may be such that communications with the second base station 507 using the second RAT 112b may be more optimal than communications 509 with the first base station 505 using the first RAT 112a. If the existing connection between the UE 102 and the first base station 505 using the first RAT 112a is lost or starting to fade, it may be beneficial for the UE 102 to switch to a connection with another base station. However, another base station using the first RAT 112a may not be available for a handover by the UE 102. Alternatively, another base station using the first RAT 112a but having a different network operator may be nearby the UE 102 but the cost of switching to the different network operator may be prohibitively expensive for the UE 102. It may be beneficial for an inter-RAT and/or inter-operator handover by the UE 102.

Figure 6:
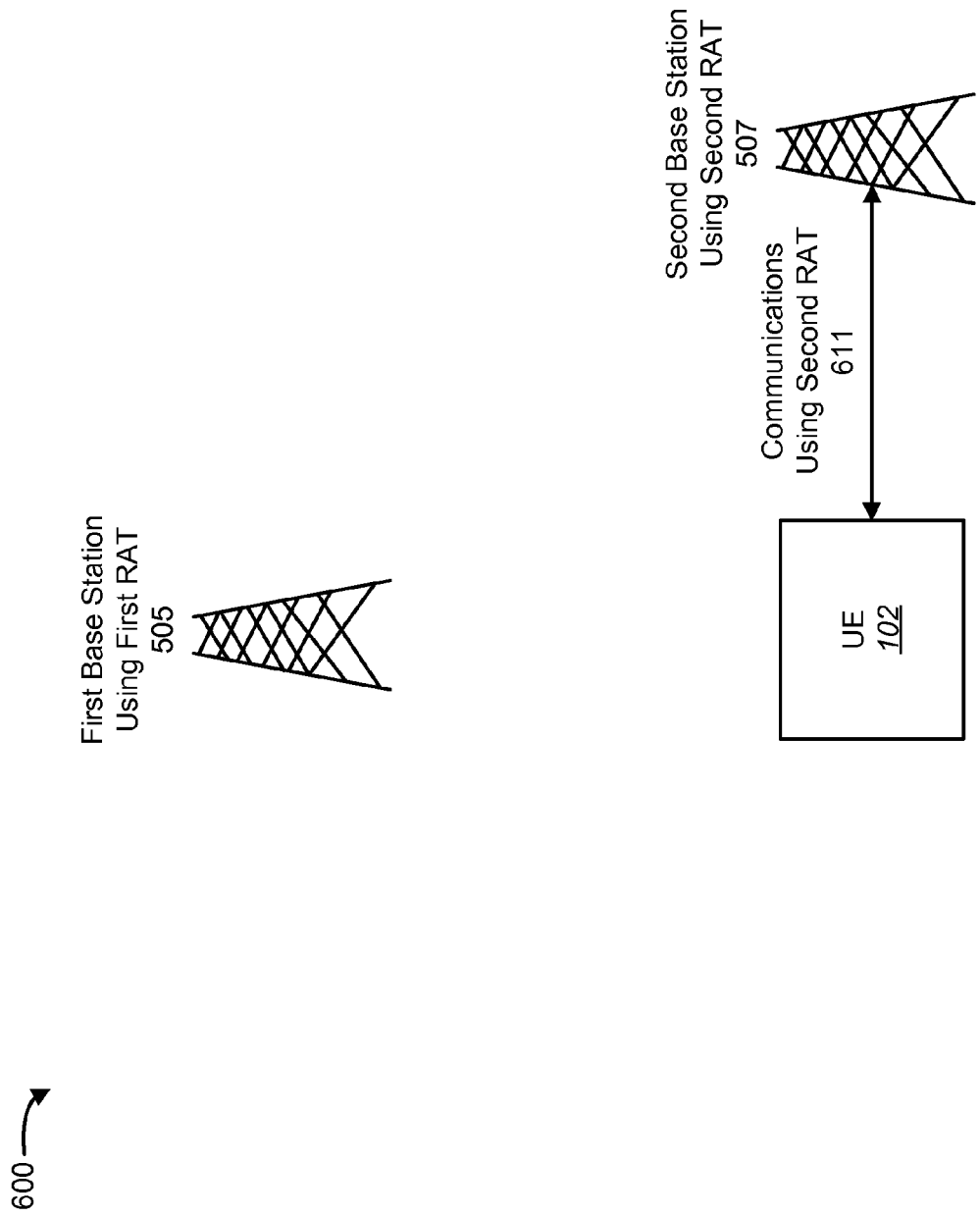
FIG. 6 shows a wireless communication system with a UE and multiple base stations after an inter-RAT, inter-operator handover by the UE.

FIG. 6 shows a wireless communication system 600 with a UE 102 and multiple base stations 505, 507 after an inter-RAT, inter-operator handover by the UE 102. The UE 102 may be connected to the second base station 507 using the second RAT 112b. In other words, the UE 102 may communicate 611 with the second base station 507 using the second RAT 112b. Communications 611 with the second base station 507 using the second RAT 112b may be optimal compared to communications 509 with the first base station 505 using the first RAT 112a.

Figure 7:
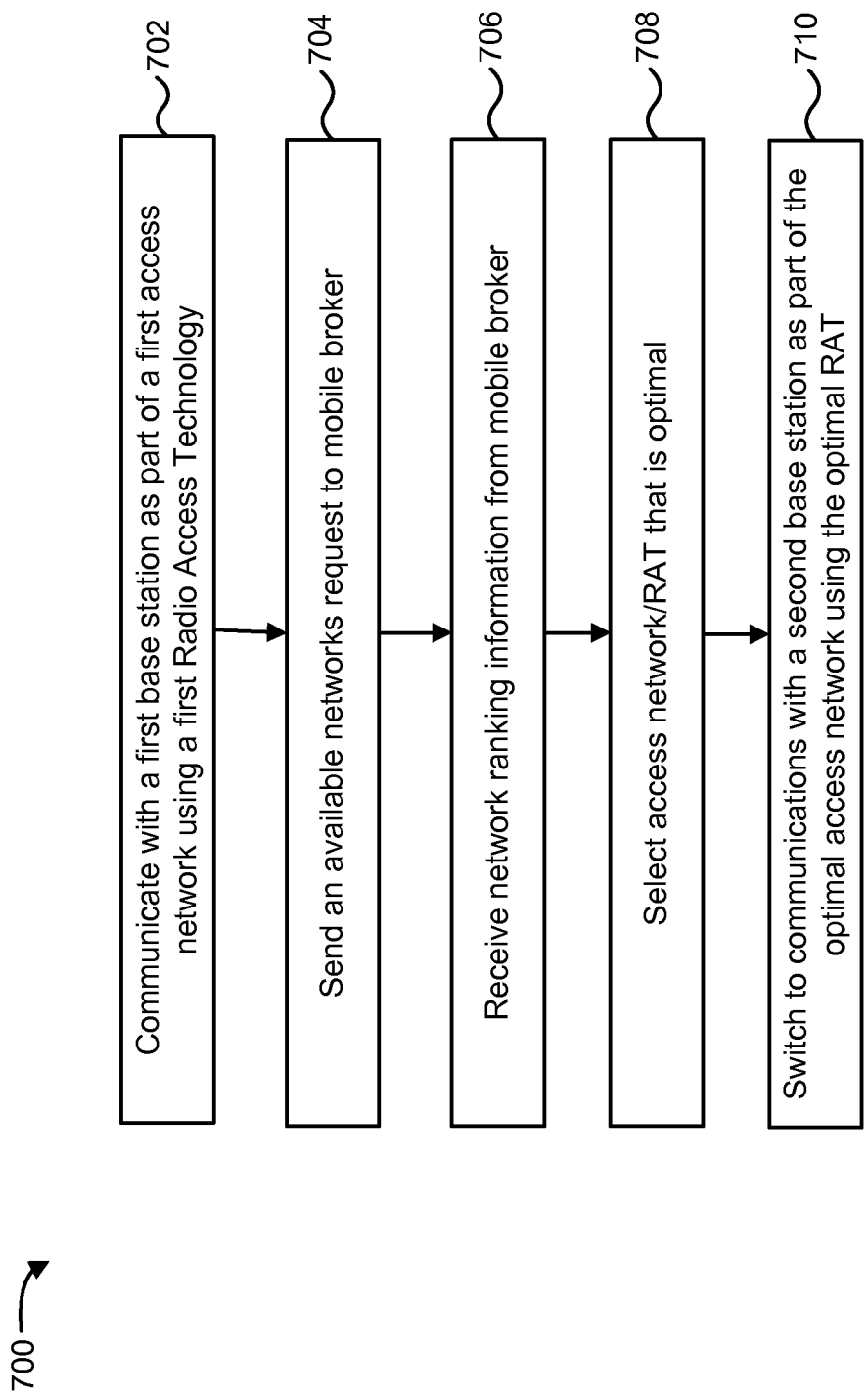
FIG. 7 is a flow diagram illustrating a method for inter-RAT, inter-operator handovers.

FIG. 7 is a flow diagram illustrating a method 700 for inter-RAT, inter-operator handovers. A UE 102 may communicate 702 with a first base station 505 as part of a first access network 104a using a first RAT 112a. The UE 102 may be connected to the core network 108 through the first base station 505. The UE 102 may send 704 an available networks request 334 to a mobile broker 210. As discussed above in relation to FIG. 3, an available networks request 334 may be a request for information about available access networks 104 from a mobile broker 210.

After the UE 104 has sent an available networks request 334 to the mobile broker 210, the UE 102 may receive 706 network ranking information 322. The UE 102 may receive 706 the network ranking information 322 from the mobile broker 210. The network ranking information 322 may include a list of the access networks 104 available to the UE 102. The network ranking information 322 may also include suggested rankings for the available access networks 104. Based on the received network ranking information 322, the UE 102 may select 708 the access network 104/RAT 112 that is optimal. The UE 102 may then switch 710 to communications with a second base station 507 as part of the optimal access network 104 using the optimal RAT 112.

Figure 8:
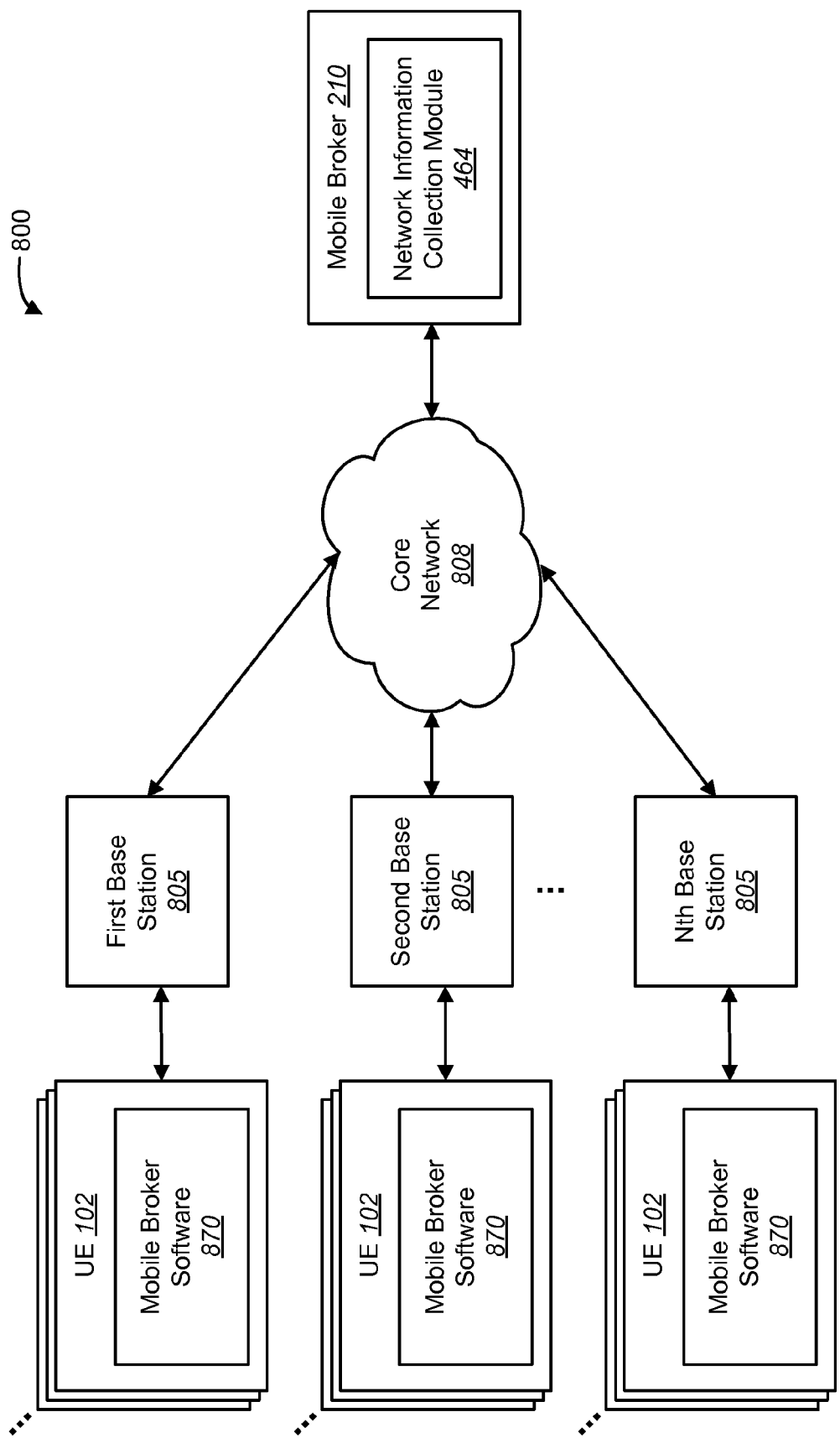
FIG. 8 is a block diagram illustrating a wireless communication system with network information collection.

FIG. 8 is a block diagram illustrating a wireless communication system 800 with network information collection. The wireless communication system 800 may include a mobile broker 210. The mobile broker 210 may include a network information collection module 464. The mobile broker 210 may have existing relationships with one or more UEs 102 in the wireless communication system 800. For example, each UE 102 may operate mobile broker software 870. Each UE 102 may communicate with the mobile broker 210 through a base station 805 and the core network 808. The mobile broker 210 may thus collect network information from many UEs 102 representing many locations and access networks 104.

A UE 802 may collect information such as the UE location 336 and network information 330 for the networks seen by the UE 102. A UE 102 may collect this information periodically or upon receiving a request for the information from the mobile broker 210. A UE 102 may then send the collected information to the mobile broker 210 through a base station 805 and the core network 808. A UE 102 may send the collected information to the mobile broker 210 periodically. Alternatively, a UE 102 may send the collected information to the mobile broker 210 when the UE 102 receives a request for the collected information from the mobile broker 210.

The mobile broker 210 may pay the users of UEs 802 for collecting and/or sending information to the mobile broker 210. For example, the mobile broker 210 may give money or credits to the users of UEs 802 that collect and/or send information to the mobile broker 210. A user of a UE 802 may redeem the credits when the UE 802 makes a request 334 for available networks 104 to the mobile broker 210. The mobile broker 210 may charge the users of UEs 802 for the service provided by the mobile broker 210. For example, the mobile broker 210 may charge a monthly subscription or pay-per-use for helping a UE 802 select the best access network 104 by sending network ranking information 322 to the UE 802. The mobile broker 210 may also send advertisements to UEs 802 along with network ranking information 322. This may be attractive because the mobile broker 210 knows the location, services and operator subscriptions of the UE 802.

Figure 9:
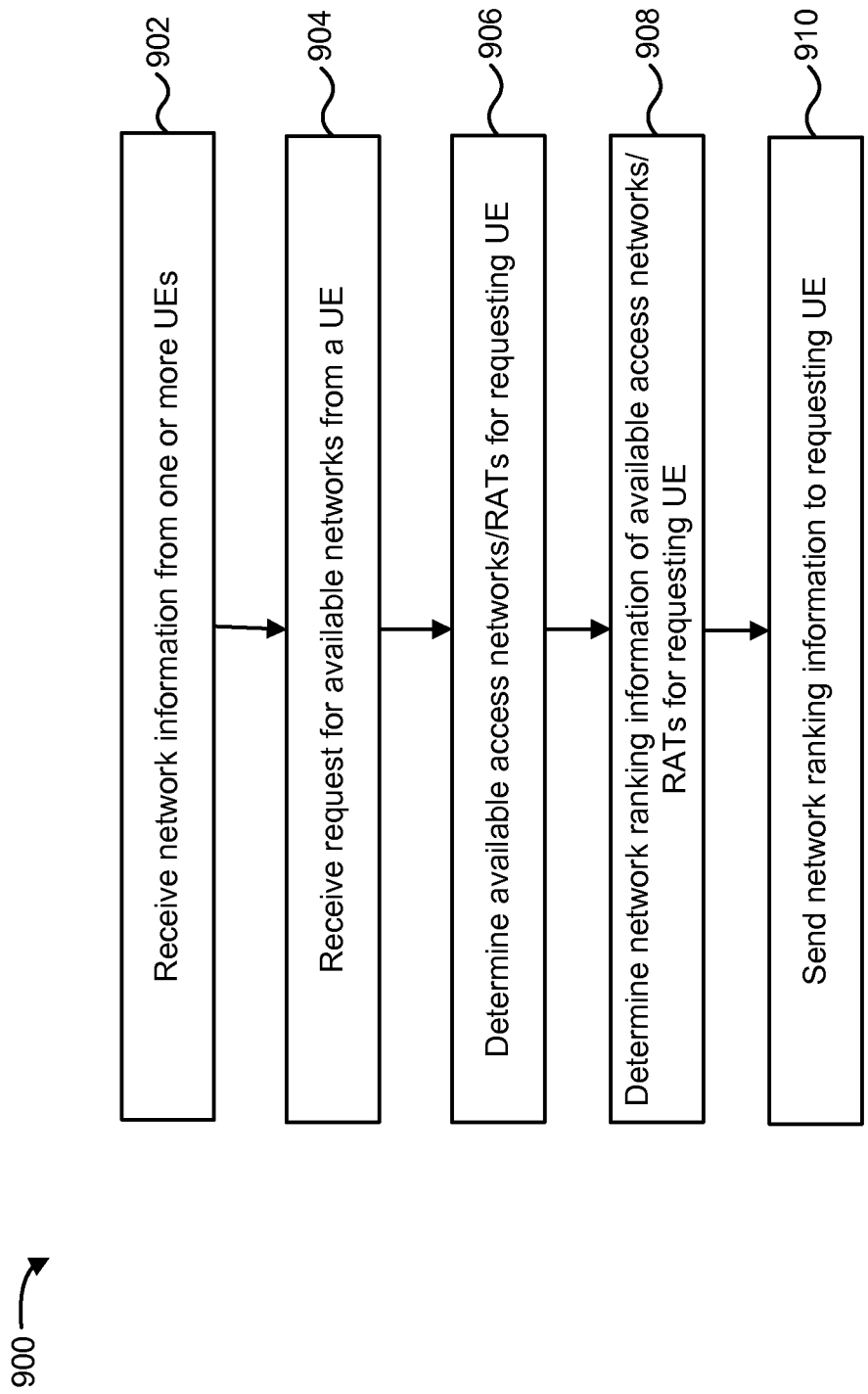
FIG. 9 is a flow diagram illustrating a method for providing network ranking information to a requesting UE.

FIG. 9 is a flow diagram illustrating a method 900 for providing network ranking information to a requesting UE 102. A mobile broker 210 may receive 902 network information from one or more UEs 102. The mobile broker 210 may store the received network information in a database. The mobile broker 210 may then receive 904 a request for the available networks 104 from a UE 102. The mobile broker 210 may determine 906 the available access networks 104/RATs 112 for the requesting UE 102. The mobile broker 210 may then determine 908 network ranking information 322 of the available access networks 104/RATs 112 for the requesting UE 102. For example, the mobile broker 210 may rank the available access networks 104/RATs 112 according to price, throughput, coverage area, etc. The mobile broker 210 may send 910 the network ranking information 322 to the requesting UE 102.

Figure 10:
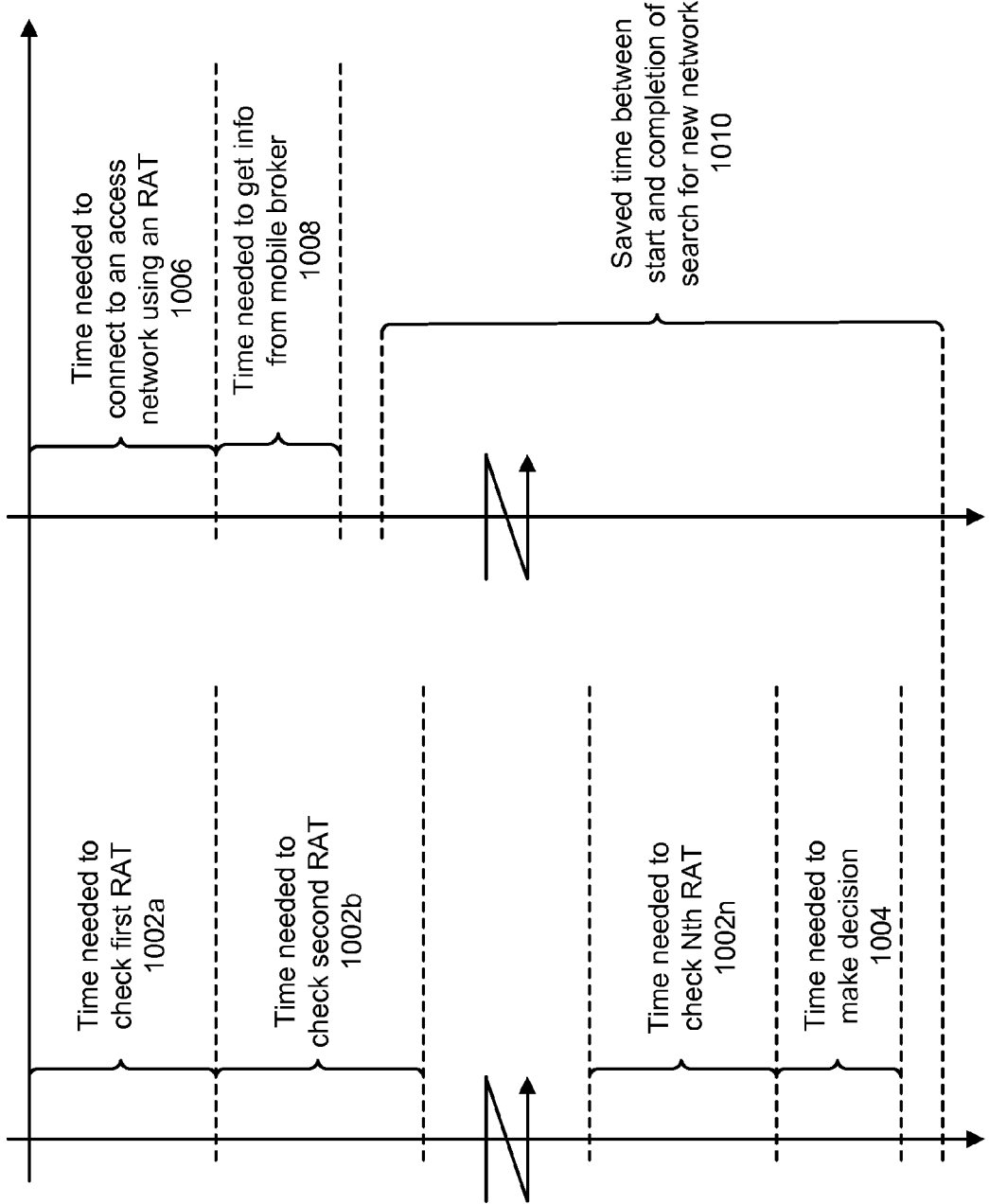
FIG. 10 illustrates an example of the time benefits that may be obtained by using a mobile broker.

FIG. 10 illustrates an example of the time benefits that may be obtained by using a mobile broker 210. If a UE 102 does not use a mobile broker 210, the UE 102 may need information from each access network 104/RAT 112 currently available to the UE 102 before the UE 102 can determine the optimal access network 104/RAT 112. For example, a certain amount of time may be necessary for the UE 102 to check each RAT 112 associated with each access network 104. Therefore, the UE 102 may use a first time duration 1002a to check the first RAT 112a, a second time duration 1002b to check the second RAT 112b, and an $n^{th}$ time duration 1002n to check the nth RAT 112n. Once the UE 102 has checked all the available RATs 112, an additional time period 1004 may be necessary for the UE 102 to make a decision of which RAT 112 is optimal.

If the UE 102 uses a mobile broker 210, the UE 102 may first connect to an access network 104 using the RAT 112 corresponding to the access network 104. The UE 102 may then gain access to the mobile broker 210. A certain amount of time 1006 may be needed to connect to the access network 104/RAT 112. The access network 104/RAT 112 may not be the optimal access network 104/RAT 112. Instead, the access network 104/RAT 112 may be a nearby access network 104/RAT 112 that allows the UE 102 to communicate with the mobile broker 210. A certain amount of time 1008 may then be required for the UE 102 to get network information from the mobile broker 210. As the number of RATs 112 increases, the time saved 1010 by using a mobile broker 210 also increases.

Figure 11:
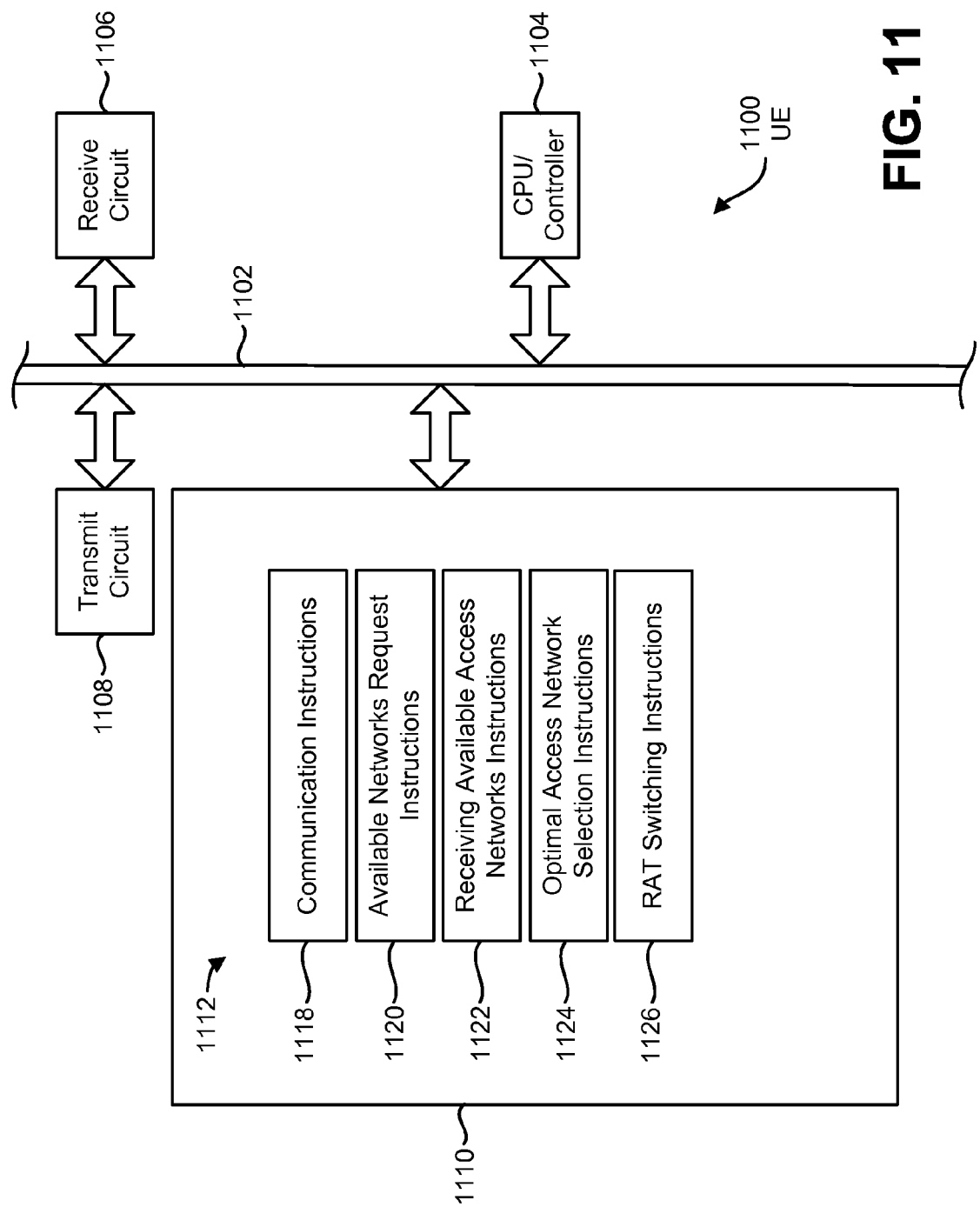
FIG. 11 shows part of a hardware implementation of an apparatus for selecting the best available access network in a communication network in a wireless communication system.

FIG. 11 shows part of a hardware implementation of an apparatus 1100 for selecting the best available access network in a communication network in a wireless communication system 100, as described above. The circuit apparatus is signified by the reference numeral 1100 and may be implemented in a network entity (e.g., a UE 102).

The apparatus 1100 comprises a central data bus 1102 linking several circuits together. The circuits include a CPU (Central Processing Unit) or a controller 1104, a receive circuit 1106, a transmit circuit 1108, and a memory unit 1110.

The receive and transmit circuits 1106 and 1108 can be connected to an RF (Radio Frequency) circuit, but that is not shown in the drawing. The receive circuit 1106 may process and buffer received signals before sending the signals out to the data bus 1102. On the other hand, the transmit circuit 1108 may process and buffer the data from the data bus 1102 before sending the data out of the device 1100. The CPU/controller 1104 may perform the function of data management of the data bus 1102 and further the function of general data processing, including executing the instructional contents of the memory unit 1110.

Instead of separately disposed as shown in FIG. 11, as an alternative, the transmit circuit 1108 and the receive circuit 1106 may be parts of the CPU/controller 1104.

The memory unit 1110 includes a set of modules and/or instructions generally signified by the reference numeral 1112. The modules/instructions 1112 may include, among other things, a communication function 1118. The communication function 1118 may allow the apparatus 1100 to send and receive data with a radio access network.

The modules/instructions 1112 may also include a function 1120 for requesting the available networks from a mobile broker. For example, this function 1120 may send a request to the mobile broker to provide a list of the networks available to the apparatus 1100.

The modules/instructions 1112 may also include a function 1122 for receiving the available access networks. For example, this function 1122 may implement detection and reception of a list of available access networks for the apparatus 1100. The modules/instructions 1112 may also include a function 1124 for selecting the optimal access network. For example, this function 1124 may implement a decision making process, whereby the optimal access network is determined. The modules/instructions 1112 may also include a function 1126 for switching radio access technologies (RAT). For example, this function 1126 may implement a switch of digital signal processing (DSP) and frequency used by the apparatus 1100.

The memory unit 1110 may be a RAM (Random Access Memory) circuit. The communication function 1118, available networks request function 1120, receiving available access networks function 1122, optimal access network selection function 1124, and RAT switching function 1126 shown in the memory unit 1110 may be software routines, modules and/or data sets. The memory unit 1110 can be tied to another memory circuit (not shown) which can either be of the volatile or nonvolatile type. As an alternative, the memory unit 1110 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 1104 shown and described in the drawing figure of FIG. 11, for execution. Such a medium can be of the storage type and may take the form of a volatile or nonvolatile storage medium as also described previously, for example, in the description of the memory unit 1110 in FIG. 11.

Figure 12:
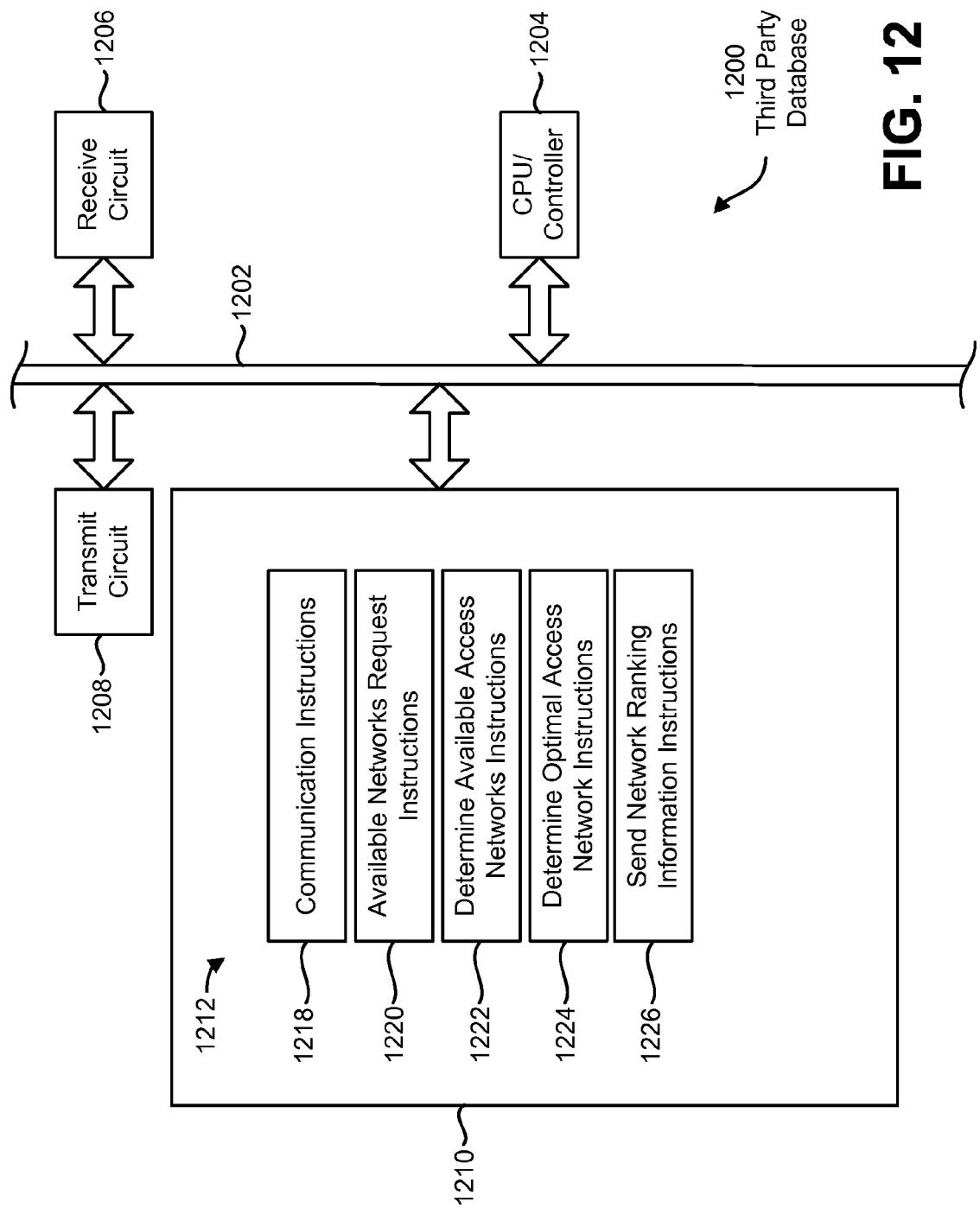
FIG. 12 shows part of a hardware implementation of an apparatus for determining the best available access network in a communication network in a wireless communication system.

FIG. 12 shows part of a hardware implementation of an apparatus 1200 for determining the best available access network in a communication network in a wireless communication system 100, as described above. The circuit apparatus is signified by the reference numeral 1200 and may be implemented by or as part of a third party database 110.

The apparatus 1200 comprises a central data bus 1202 linking several circuits together. The circuits include a CPU (Central Processing Unit) or a controller 1204, a receive circuit 1206, a transmit circuit 1208, and a memory unit 1210.

The receive and transmit circuits 1206 and 1208 can be connected to an RF (Radio Frequency) circuit, but that is not shown in the drawing. The receive circuit 1206 may process and buffer received signals before sending the signals out to the data bus 1202. On the other hand, the transmit circuit 1208 may process and buffer the data from the data bus 1202 before sending the data out of the device 1200. The CPU/controller 1204 may perform the function of data management of the data bus 1202 and further the function of general data processing, including executing the instructional contents of the memory unit 1210.

Instead of separately disposed as shown in FIG. 12, as an alternative, the transmit circuit 1208 and the receive circuit 1206 may be parts of the CPU/controller 1204.

The memory unit 1210 includes a set of modules and/or instructions generally signified by the reference numeral 1212. The modules/instructions 1212 may include, among other things, a communication function 1218. The communication function 1218 may allow the apparatus 1200 to send and receive data with a radio access network.

The modules/instructions 1212 may also include a function 1220 for receiving a request for the available networks from a UE 102. For example, this function 1220 may receive a request from a UE 102 to provide a list of the networks available to the UE 102.

The modules/instructions 1212 may also include a function 1222 for determining the available access networks. For example, this function 1222 may implement detection and reception of a list of available access networks for a UE 102. The modules/instructions 1212 may also include a function 1224 for determining the optimal access network. For example, this function 1224 may implement a decision making process, whereby the optimal access network is determined. The modules/instructions 1212 may also include a function 1226 for sending network ranking information to a UE 102.

The memory unit 1210 may be a RAM (Random Access Memory) circuit. The communication function 1218, available networks request function 1220, determining available access networks function 1222, determining optimal access network function 1224, and sending network ranking information function 1226 shown in the memory unit 1210 may be software routines, modules and/or data sets. The memory unit 1210 can be tied to another memory circuit (not shown) which can either be of the volatile or nonvolatile type. As an alternative, the memory unit 1210 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" and "computer-program product" refer to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 7 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus comprising:
a processor; and
circuitry coupled to the processor, the circuitry configured to:
communicate with a first base station that is part of a first access network using a first radio access technology (RAT);
send a request for available access networks to a mobile broker, wherein the request for available access networks is configured to be triggered by a policy-based trigger when a received signal strength is below a sixty percent level;
receive, from the mobile broker, information including a ranked list of available access networks;
select a second access network and a corresponding second RAT based on the ranked list; and
switch to a communication with a second base station using the second RAT.

2. The apparatus of claim 1, wherein the request for available access networks is a request for information associated with access networks available to the processor.

3. The apparatus of claim 1, wherein the second base station is part of the second access network.

4. The apparatus of claim 1, wherein the processor and the circuitry are included in a wireless communications device.

5. The apparatus of claim 4, wherein the request for available access networks includes information corresponding to a service provider associated with the wireless communications device.

6. The apparatus of claim 4, wherein the request for available access networks is further configured to be triggered by a user and wherein the user is associated with the wireless communications device.

7. The apparatus of claim 1, wherein switching to the communication with the second base station involves an inter-RAT, inter-operator handover.

8. The apparatus of claim 1, wherein switching to the communication with the second base station is associated with beginning a new communication session.

9. The apparatus of claim 1, wherein switching to the communication with the second base station includes a continuation of an existing communication session.

10. The apparatus of claim 1, wherein the ranked list ranks the available access networks based on signal-to-noise ratios or based on channel download rates, wherein each signal-to-noise ratio is associated with a corresponding available access network, and wherein each channel download rate is associated with a corresponding available access network.

11. A method comprising:
communicating, from an apparatus, with a first base station that is part of a first access network using a first radio access technology (RAT);
sending, from the apparatus, a policy-triggered request for available access networks to a mobile broker when a received signal strength falls below a sixty percent level;
receiving, at the apparatus, access network information associated with access networks available to the apparatus including a ranked list of available access networks from the mobile broker;
selecting a second access network and a corresponding second RAT based on the ranked list; and
switching to a communication with a second base station using the second RAT.

12. The method of claim 11, wherein the policy-triggered request for available access networks includes a request for the access network information.

13. The method of claim 11, wherein the apparatus is a wireless communications device.

14. The method of claim 11, wherein the policy-triggered request for available access networks includes velocity information associated with the apparatus.

15. The method of claim 11, wherein the policy-triggered request for available access networks includes cost information associated with the apparatus.

16. The method of claim 11, wherein the access network information includes an advertisement.

17. The method of claim 7, further comprising, sending a user-triggered request for available access networks from the apparatus to the mobile broker.

18. The method of claim 11, wherein switching to the communication with the second base station involves an inter-RAT, inter-operator handover.

19. The method of claim 11, wherein switching to the communication with the second base station is the beginning of a new session.

20. The method of claim 11, wherein switching to the communication with the second base station is a continuation of a session of communications.

21. An apparatus comprising:
a processor; and
circuitry coupled to the processor, the circuitry configured to:
receive network information from one or more user equipments (UEs);
receive a policy-triggered request for available access networks from a requesting UE when a received signal strength falls below a sixty percent level;
determine the available access networks and corresponding radio access technologies (RATs) for the requesting UE;
determine network ranking information of the available access networks and the corresponding RATs for the requesting UE; and
send the network ranking information to the requesting UE.

22. The apparatus of claim 21, wherein the circuitry is further configured to store the received network information in a network information database.

23. The apparatus of claim 21, wherein the network information is periodically received from at least one of the one or more UEs.

24. The apparatus of claim 21, wherein the circuitry is further configured to send a request for the network information to the one or more UEs.

25. The apparatus of claim 21, wherein the network information comprises channel quality indicators.

26. The apparatus of claim 21, wherein the circuitry is further configured to calculate a velocity associated with the requesting UE.

27. The apparatus of claim 21, wherein the network information comprises an experienced throughput associated with the requesting UE.

28. The apparatus of claim 21, wherein the network information comprises communication quality information associated with a wireless channel.

29. The apparatus of claim 21, wherein the circuitry is further configured to credit an account associated with a particular UE of the one or more UEs in exchange for the received network information from the particular UE.

30. The apparatus of claim 21, wherein the circuitry is further configured to receive access network cost information from the requesting UE.

31. The apparatus of claim 30, wherein the network ranking information of the available access networks is based on the received access network cost information from the requesting UE.

32. The apparatus of claim 21, wherein the circuitry is further configured to receive a user-triggered request for available access networks from the requesting UE.

33. An apparatus comprising:
means for communicating with a first base station as part of a first access network using a first radio access technology (RAT);
means for sending a request for available access networks to a mobile broker, wherein the request for available access networks is configured to be triggered by a policy-based trigger when a received signal strength falls below a sixty percent level;
means for receiving information including a ranked list of available access networks from the mobile broker;
means for selecting a second access network and a corresponding second RAT based on the received information; and
means for switching to a communication with a second base station using the second RAT.

34. The apparatus of claim 33, wherein the request for available access networks is further configured to be triggered by a user.

35. A non-transitory processor-readable medium including processor-executable instructions that, when executed by a processor, cause the processor to:
communicate with a first base station as part of a first access network using a first radio access technology (RAT);
send a request for available access networks to a mobile broker, wherein the request for available access networks is automatically sent when a received signal strength falls below a sixty percent level;
receive information including a ranked list of available access networks from the mobile broker;
select a second access network and a corresponding second RAT based on the received information; and
switch to a communication with a second base station using the second RAT.

36. The non-transitory processor-readable medium of claim 35, wherein the request for available access networks is further configured to be triggered by a user.

\* \* \* \* \*